United States Patent [19]

Antonevich

[11] 3,931,921
[45] Jan. 13, 1976

[54] ULTRASONIC FLAME SOLDERING TOOL
[75] Inventor: John N. Antonevich, Jamestown, N.Y.
[73] Assignee: Blackstone Corporation, Jamestown, N.Y.
[22] Filed: Sept. 27, 1974
[21] Appl. No.: 509,948

[52] U.S. Cl. .................................. 228/1; 228/41 R
[51] Int. Cl.² ........................................... B23K 1/06
[58] Field of Search ............................. 228/1, 19, 41

[56]  References Cited
UNITED STATES PATENTS

| 2,158,489 | 5/1939 | Walker | 228/41 X |
| 2,833,238 | 5/1958 | Jones et al. | 228/1 |
| 2,902,577 | 9/1959 | Brown | 228/1 |
| 3,735,911 | 5/1973 | Ward | 228/19 |

Primary Examiner—Harold D. Whitehead
Assistant Examiner—James G. Smith
Attorney, Agent, or Firm—Buell, Blenko & Ziesenheim

[57] ABSTRACT

An ultrasonic flame soldering tool is provided which combines an ultrasonic contact probe and an acetylene air torch into a compact, convenient soldering unit. The tool can be used for soldering new or previously soldered joints in aluminum or other metals without the necessity of using a flux.

6 Claims, 1 Drawing Figure

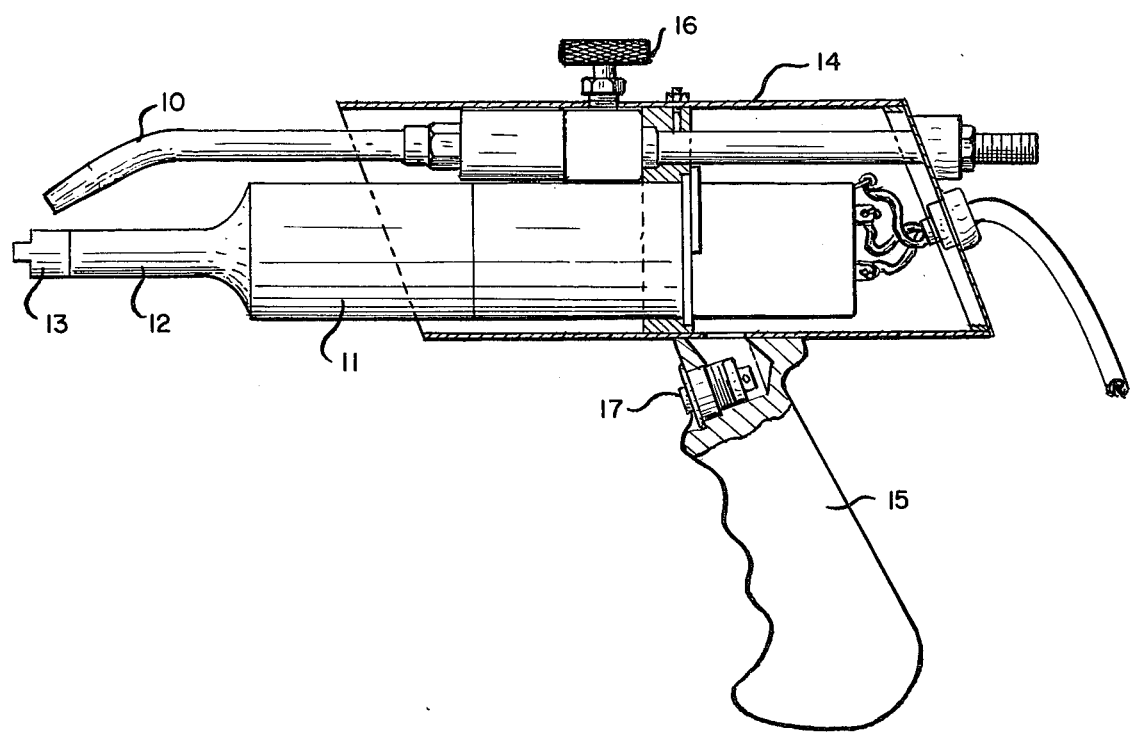

ULTRASONIC FLAME SOLDERING TOOL

This invention relates to an ultrasonic soldering tool and particularly to a tool for soldering new and previously soldered joints in aluminum or other metals without the use of a flux. The tool of the present invention is a convenient and compact unit which greatly facilitates the soldering of joints in metals without the use of flux.

The present invention provides a novel and significant improvement over present tools. The invention provides a light weight, compact and easily handled combination heat source and ultrasonic horn. The horn is replaceable and designed to fit the part to be soldered thereby assuring maximum agitation or cavitation of the solder. Further the combination of the present invention minimizes heat transfer from the heat source to the ultrasonic horn thereby permitting the use of high soldering temperatures. Also by eliminating the need for the use of a flux in the soldering operation the problems of corrosion caused by the flux are eliminated.

In the preferred form, my invention provides a heat source consisting of an acetylene air torch used to heat the work piece to soldering or brazing temperatures. An ultrasonic horn with tip design to fit the configuration of the parts is used to transmit ultrasonic energy into the joint. The ultrasonic energy transmitted to the joint causes cavitation or an interfacial scrubbing action of the solder thereby removing oxide from the base metal and effecting a metallurgical bond between the solder and the base metal. The generator and hoses and regulator which form an attachment of the heat source to an acetylene tank are also provided. In the foregoing general description, I have set out certain purposes, objects, and advantages of my invention. It will be described hereafter and will become apparent for those skilled in the art of soldering of metals when considering the following description and drawings showing an elevational view, partly the cross section, of a preferred embodiment of my invention.

Referring to the drawing, I have illustrated an ultrasonic soldering tool comprising a heat source 10, transducer 11, and horn 12 having tip 13 which is interchangeable and shaped to fit the configuration of work to be soldered. Heat source 10 and transducer 11 are affixed in case 14 to handle 15 in any manner suitable.

Heat source 10 is connected by means of a conduit to an acetylene tank. An open-close valve 16 is used to regulate the flow of the acetylene through heat source 10.

Transducer 11 is connected by means well known in the art to an electrical generator (not shown). The transducer is made from any of a variety of materials but in the preferred embodiment is piezoelectric ceramic such as PZT-4 Crystal. On-off switch 17 is inserted in handle 15 and is used to turn the generator on and off. Switch 17 is the pressure type and is open when pressure is not applied. The generator to which the transducer is connected can be any one of several commercially available ones. Preferably it should be adjustable as to output and duration of output.

Horn 12 is a low thermal conductivity material, such as Ti—6Al—4V Alloy, affixed to the transducer by means of a stud or like mechanical means. Tip 13 is also a low thermal conductivity alloy attached to horn 12 by mating threads on the exterior surface of the horn and the interior of the tip. Tip 13 may be changed depending on the configuration of the piece to be soldered.

The operation of the apparatus of this invention is as follows. Switch 16 is opened to permit the flow of acetylene completely through the heat source 10. The acetylene is ignited and the joint area is then heated above the melting point of the solder. Switch 16 is then closed. Solder is applied in the joint area by means well known in the art. Switch 17 is then depressed activating the generator causing an ultrasonic impulse to be delivered to the joint area through tip 13. The creation of the impulse by means of a generator and transducer is well understood by anyone of ordinary skill in the art. The impulse cavitates the solder and accomplishes a metallurgical bond between the solder and the base metal. This process is likewise well understood by one of ordinary skill in the art. The strength and duration of the ultrasonic impulse is determined by setting the generator. In the preferred embodiment the operation of frequency of the apparatus would be in the 16 KHZ to 90 KHZ range and operates during a 1 to 10 second period.

In the foregoing specification I have set out a certain preferred embodiment of my invention, however, it will be understood that this invention may be otherwise embodied within the scope of the following claims.

I claim:

1. An ultrasonic flame soldering tool comprising, a flame heat source means, and transducer means, spaced from the heat source means and connected thereto, said transducer means having tip means fixably attached thereto and extending forward of said flame heat source means and generally outside said flame source means to contact a work piece being soldered whereby the work piece is separately heated and subject to ultrasonic vibrations at solder temperature to cause molten solder on the work piece to wet and adhere to work piece.

2. The ultrasonic flame soldering tool of claim 1 wherein said transducer means is constructed of piezoelectric ceramic.

3. The ultrasonic flame soldering tool of claim 2 wherein said transducer has frequency between 16 and 90 KHZ.

4. The ultrasonic flame soldering tool of claim 2 wherein said transducer has frequence of operation of 20 KHZ.

5. The ultrasonic flame soldering tool of claim 1 wherein the flame source is acetylene and air.

6. The ultrasonic flame soldering tool of claim 1 wherein the tip means is constructed of titanium alloy.

* * * * *